(12) United States Patent
Serra et al.

(10) Patent No.: US 7,637,585 B2
(45) Date of Patent: Dec. 29, 2009

(54) HALFTONE PRINTING ON AN INKJET PRINTER

(75) Inventors: Marc Serra, Barcelona (ES); Xavier Alonso, Sant Cugat del Valles (ES); Marc Rossinyol, Berga (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 11/810,226

(22) Filed: Jun. 5, 2007

(65) Prior Publication Data

US 2008/0303852 A1 Dec. 11, 2008

(51) Int. Cl.
*B41J 2/205* (2006.01)

(52) U.S. Cl. .......................................... 347/15; 358/1.2

(58) Field of Classification Search .................... 347/12, 347/15, 43, 41, 96, 100, 101; 358/1.2, 1.9
See application file for complete search history.

(56) References Cited

U.S. PATENT DOCUMENTS

| | | | |
|---|---|---|---|
| 4,350,986 A | | 9/1982 | Yamada |
| 4,394,662 A | | 7/1983 | Yoshida et al. |
| 5,067,025 A | | 11/1991 | Kitagawa |
| 5,099,259 A | * | 3/1992 | Hirahara et al. ............. 347/183 |
| 5,610,637 A | * | 3/1997 | Sekiya et al. ................. 347/10 |
| 5,975,679 A | | 11/1999 | Nicoloff |
| 6,099,108 A | | 8/2000 | Weber |
| 6,193,347 B1 | * | 2/2001 | Askeland et al. ............... 347/15 |
| 6,347,854 B1 | | 2/2002 | Okuda et al. |
| 6,443,547 B1 | | 9/2002 | Takahashi |
| 6,493,112 B1 | | 12/2002 | Arce et al. |
| 6,538,772 B1 | | 3/2003 | Choulet |
| 6,916,077 B2 | * | 7/2005 | Eguchi et al. ................. 347/12 |
| 6,956,675 B2 | | 10/2005 | Nose |
| 6,982,814 B1 | | 1/2006 | Frazier et al. |
| 6,985,256 B2 | | 1/2006 | Cheng |
| 7,031,025 B1 | | 4/2006 | He et al. |
| 2003/0007024 A1 | * | 1/2003 | Fujimori ....................... 347/15 |
| 2004/0085587 A1 | | 5/2004 | Broddin et al. |
| 2004/0090654 A1 | | 5/2004 | Minnebo et al. |
| 2004/0130753 A1 | | 7/2004 | Crounse |
| 2005/0200900 A1 | | 9/2005 | Hirano |
| 2005/0264834 A1 | | 12/2005 | Asai et al. |
| 2006/0170974 A1 | | 8/2006 | Wang et al. |
| 2006/0198964 A1 | | 9/2006 | Kaiser |
| 2007/0058201 A1 | | 3/2007 | Ike et al. |
| 2007/0188813 A1 | * | 8/2007 | Ozawa ....................... 358/3.21 |
| 2007/0197685 A1 | * | 8/2007 | Aruga et al. ................ 523/160 |

FOREIGN PATENT DOCUMENTS

EP 0273664 B1 7/1993

OTHER PUBLICATIONS

QMS, Inc., "Color Reproduction", Feb. 15, 1996, QMS, Inc., available on the internet at http://www.tu-harburg.de/rzt/tuinfo/periph/drucker/Color_Reproduktion/.

* cited by examiner

*Primary Examiner*—Lamson D Nguyen

(57) ABSTRACT

An inkjet printer is used to print on media an amplitude modulated (AM) halftoning pattern where dot size is varied to create different tones. Different sized dots are formed on the media by depositing different patterns of adjacent drops that coalesce into the different sized dots.

18 Claims, 5 Drawing Sheets

HALFTONE PRINTING ON AN INKJET PRINTER

BACKGROUND

Halftone is a reprographic technique that simulates continuous tone images. Halftoning algorithms can be used to create a binary representation of a continuous tone image. Different types of printers have utilized different types of halftone methodologies that are a good fit to the printer technology.

For example, inkjet printing mechanisms use moveable cartridges, also called pens, that use one or more printheads formed with very small nozzles through which drops of liquid ink (e.g., dissolved colorants or pigments dispersed in a solvent) are fired. To print an image, the carriage traverses over the surface of the print medium, and the ink ejection elements associated with the nozzles are controlled to eject drops of ink at appropriate times pursuant to command of a microcomputer or other controller. The pattern of pixels on the print media resulting from the firing of ink drops results in the printed image.

In inkjet printers, halftone imaging is typically accomplished using error diffusion, blue noise or other halftone algorithms that require limited or no dot size variations.

DESCRIPTION OF THE EMBODIMENT

Figure 1:
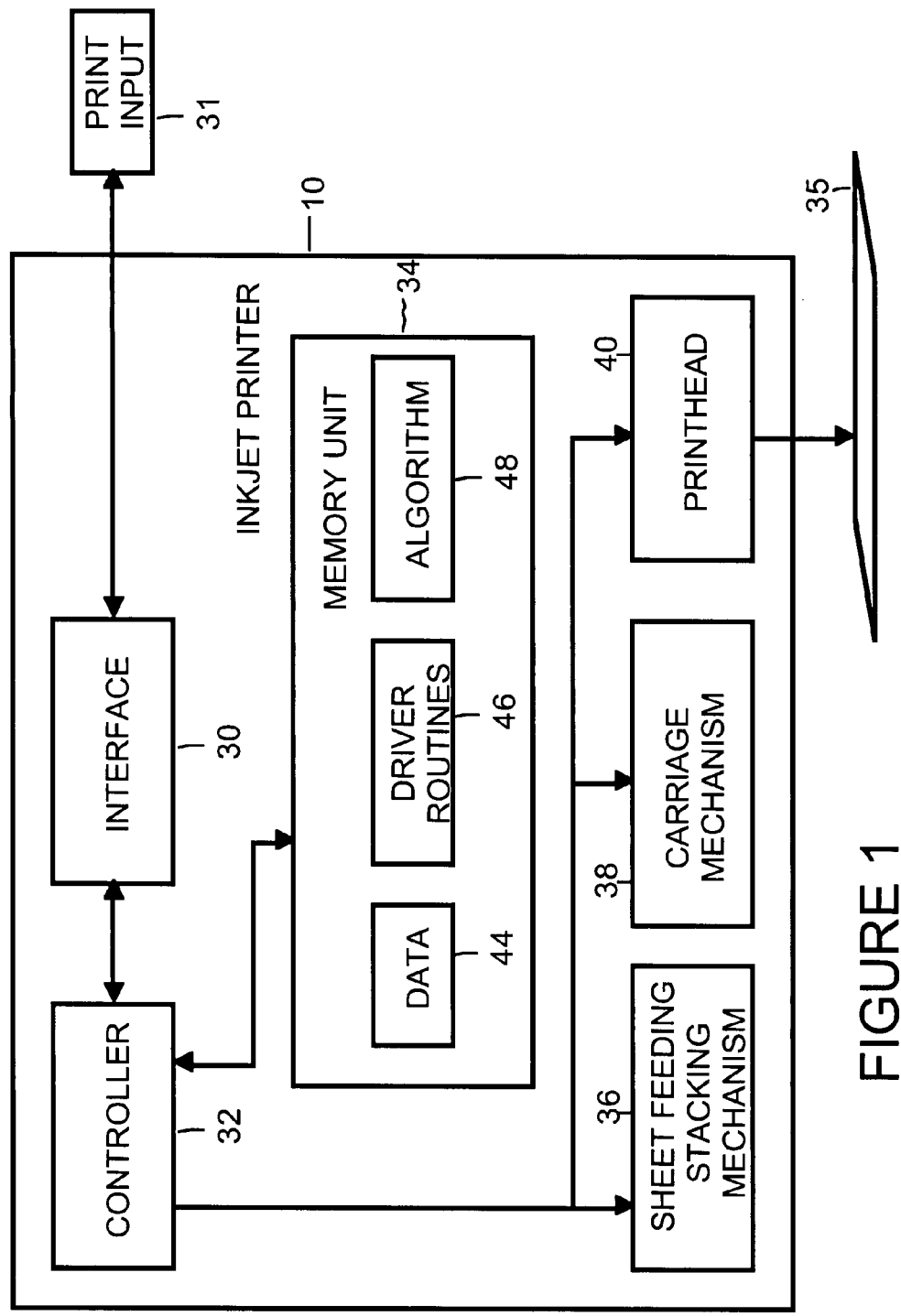
FIG. 1 is a simplified block diagram of an inkjet printer in accordance with an embodiment of the present invention.

FIG. 1 is a simplified block diagram of an inkjet printer 10. Inkjet printer 10 includes, for example, a controller 32 that, via an interface unit 30, receives print input 31 from a computer system or some other device, such as a scanner or fax machine. The interface unit 30 facilitates the transferring of data and command signals to controller 32 for printing purposes. Interface unit 30 also enables inkjet printer 10 to download print image information to be printed on a print medium 35.

In order to store the data, at least temporarily, inkjet printer 10 includes a memory unit 34. For example, memory unit 34 is divided into a plurality of storage areas that facilitate printer operations. The storage areas include a data storage area 44, driver routines storage 46, and algorithm storage area 48 that holds the algorithms that facilitate the mechanical control implementation of the various mechanical mechanisms of inkjet printer 10.

Data area 44 receives data files that define the individual pixel values that are to be printed to form a desired object or textual image on medium 35. Driver routines 46 contain printer driver routines. Algorithms 48 include the routines that control a sheet feeding stacking mechanism for moving a medium through the printer from a supply or feed tray to an output tray and the routines that control a carriage mechanism that causes a printhead carriage unit to be moved across a print medium on a guide rod.

In operation, inkjet printer 10 responds to commands by printing full color or black print images on print medium 35. In addition to interacting with memory unit 34, controller 32 controls a sheet feeding stacking mechanism 36 and a carriage mechanism 38. Controller 32 also forwards printhead firing data to one or more printheads, represented in FIG. 1 by a printhead 40. The input data received at interface 30 includes, for example, information describing printed characters and/or images for printing. For example, input data may be in a printer format language such as Postscript, PCL 3, PCL 5, HPGL, HPGL 2 or some related version of these. Alternatively, the input data may be formatted as raster data or formatted in some other printer language. The printhead firing data sent to printhead 40 is used to control the ejection elements associated with the nozzles of an ink jet printer, such as for thermal ink jet printer, piezo ink jet printers or other types of ink jet printers.

Figure 2:
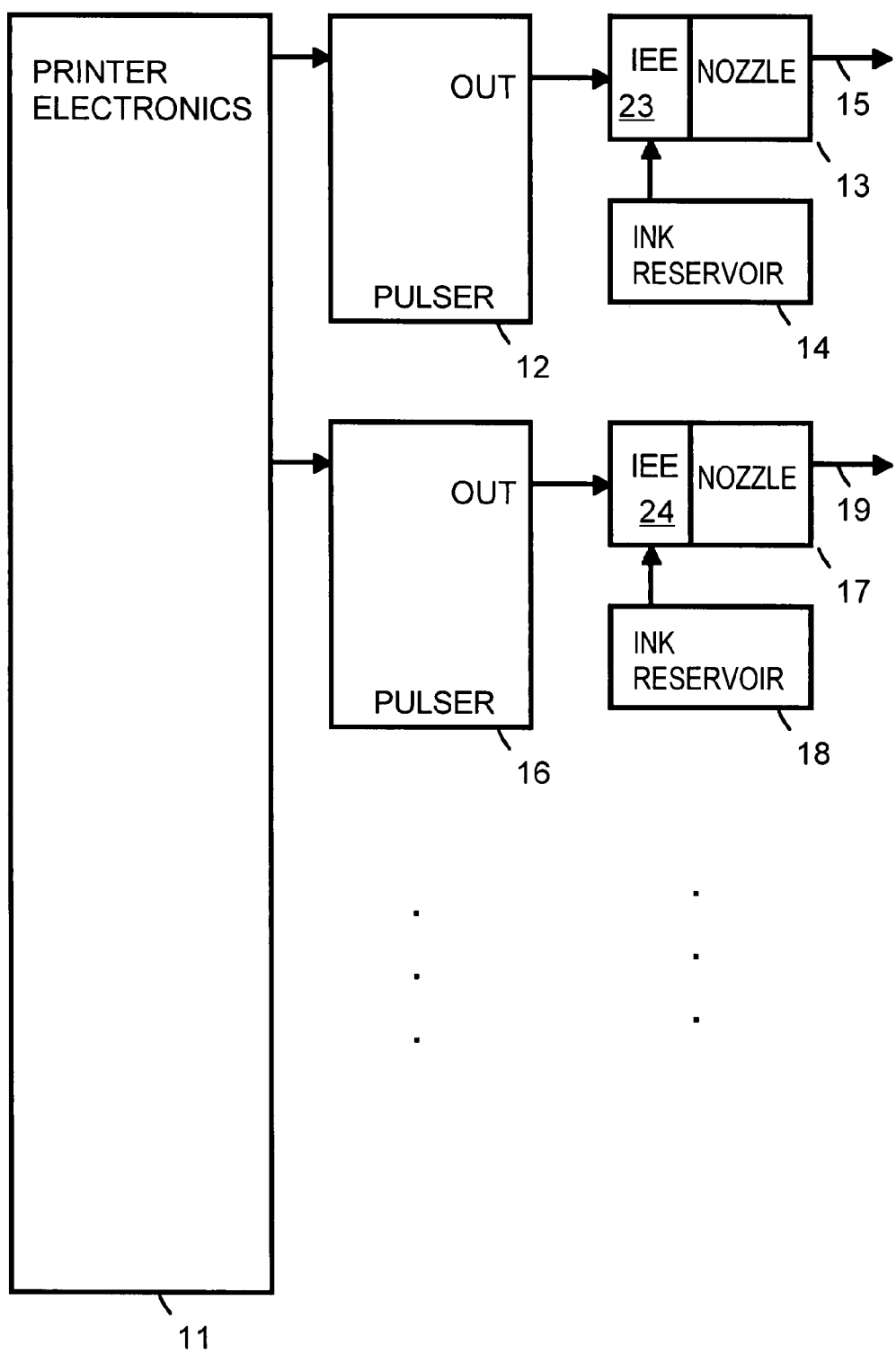
FIG. 2 is a simplified block diagram of print electronics within the inkjet printer shown in FIG. 1 in accordance with an embodiment of the present invention.

For example, as shown in FIG. 2, printhead firing data is used by a pulser 12 to generate pulses that control an ink ejection element (IEE) 23 associated with a nozzle 13 located on a printhead 40. Pulser 12 may be located on or off printhead 40, depending on the particular embodiment of the present invention. In the example shown in FIG. 2, printer electronics 11 provides to pulser 12 printhead firing data including information that sets the pulse rate and information that indicates which pulses are to be forwarded to ink ejection element 23. The pulses forwarded to ink ejection element 23 are forwarded as a current pulse that is applied to a resistor within ink ejection element 23. The current pulse causes an ink droplet 15, formed with ink from an ink reservoir 14, to be emitted from nozzle 13.

Printhead firing data generated by controller 32 is also used by a pulser 16 to generate pulses that control an ink ejection element (IEE) 24 associated with a nozzle 17. Controller 32 provides to pulser 16 printhead firing data that sets the pulse rate and indicates which pulses are to be forwarded to ink ejection element 24. The pulses forwarded to ink ejection element 24 are forwarded as a current pulse that is applied to a resistor within ink ejection element 24. The current pulse causes an ink droplet 19, formed with ink from an ink reservoir 18, to be emitted from nozzle 17. Nozzle 17 can be located on printhead 40 or on another printhead. Nozzle 15 and nozzle 17 are exemplary as each print head can have many nozzles.

Printing can be performed in one or multiple passes. Some printers utilize print modes to vary the number of passes used for printing. One pass operation facilitates increased throughput on plain paper. In a one-pass mode, all dots to be fired on a given row of dots are placed on the medium in one swath of the printhead, and then the print medium is advanced into position for the next swath. A two-pass print mode is a print pattern wherein approximately one-half of the dots available for a given row of available dots per swath are printed on each pass of the printhead, so two passes are needed to complete the printing for a given row. Similarly, a four-pass mode is a print pattern wherein approximately one fourth of the dots for a given row are printed on each pass of the printhead. In a print mode of a certain number of passes, each pass should print, of all the ink drops to be printed, a fraction equal roughly to the reciprocal of the number of passes.

Print modes are also used to determine specific partial-inking patterns. Print modes also allow the printer to control several factors during printing that influence image quality, including the amount of ink placed on the media per dot location, the speed with which the ink is placed, and the number of passes required to complete the image. Providing different print modes to allow placing ink drops in multiple swaths can help with hiding nozzle defects. Different print modes are also employed depending on the media type.

The pattern used in printing each nozzle section is known as a "print mask." Typically, if more than one pass is used to print, a different print mask is used for each pass. During multi-pass printing, a print mask is a binary pattern that determines exactly which ink drops are printed in a given pass. In other words, a print mask determines which passes are used to print each pixel. Thus, the print mask defines both the pass and the nozzle that will be used to print each pixel location, i.e., each row number and column number on the media. The print mask can be used to "mix up" the nozzles used in such a way as to reduce undesirable visible printing artifacts. In single pass printing and in multiple pass printing, a print mask can be used to reduce the firing frequency of each nozzle.

Print controller 32 (shown in FIG. 1) controls carriage mechanism 38 and media 35 movements and activates the nozzles for ink drop deposition. By combining the relative movement of the carriage mechanism 38 along the scan direction 61 with the relative movement of the print medium 35 along the medium movement direction 62, each printhead 40 can deposit one or more drops of ink at each individual one of the pixel locations on the print medium 35. A print mask is used by print controller 32 to govern the deposition of ink drops from printhead 40. For example, a separate print mask may exist for each discrete intensity level of color (e.g. light to dark) supported by inkjet printer 10. For each pixel position in a row during an individual printing pass, the print mask has a print mask pattern which acts both to enable the nozzle positioned adjacent the row to print, or disable that nozzle from printing, on that pixel location, and to define the number of drops to be deposited from enabled nozzles. Whether or not the pixel will actually be printed on by the corresponding enabled nozzle depends on whether the image data to be printed requires a pixel of that ink color in that pixel location. The print mask is typically implemented in firmware in inkjet printer 10, although it can be alternatively implemented in a software driver in a computing processor (not shown) external to the printer.

The term printing pass, as used herein, refers to those passes in which printhead 40 is enabled for printing as the nozzle arrangement moves relative to the medium 35 in the scan direction 61. In bi-directional printing, each forward and rearward pass along the scan direction 61 can be a printing pass. In unidirectional printing, printing passes can occur in only one of the directions of movement. In a given printing pass of the carriage mechanism 38 over the print medium 35 in a multi-pass printer, only the certain pixel locations enabled by the print mask can be printed, and inkjet printer 10 deposits the number of drops specified by the print mask for the corresponding pixel locations if the image data so requires. The print mask pattern is such that additional drops for the certain pixel locations, as well as drops for other pixel locations in the swath, are filled in during other printing passes.

Water based inks are often used on porous media, such as paper. On non-porous material, such as polyvinylchloride (PVC), polyethylene, polypropylene, and etc., solvent and ultraviolet (UV) curing ink are often used to prevent colorant (i.e., pigment) migrations on the media that cause, what is often considered, undesirable image quality defects, such as coalescence.

In an embodiment of the present invention, in order to achieve amplitude modulated (AM) halftoning, drops deposited during printing are intentionally induced to coalesce in order to create the variations in dot size required for AM halftoning. In AM halftoning, the dot size is varied to create different tones.

Figure 3:
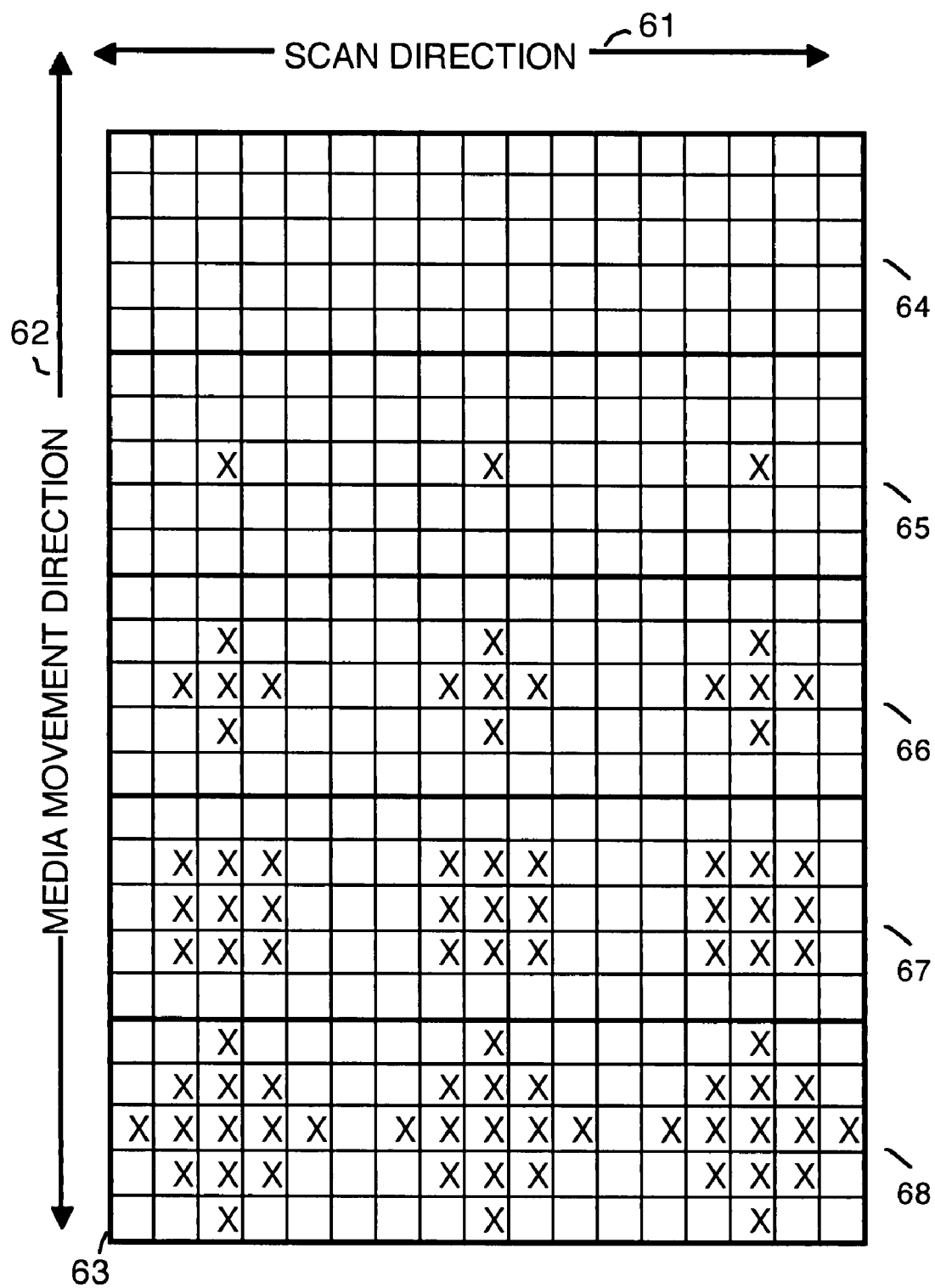
FIG. 3 is a portion of a print mask illustrating AM halftone printing by the inkjet printer shown in FIG. 1 in accordance with an embodiment of the present invention.

FIG. 3 shows an example of a portion of a printing mask 63 that illustrates AM halftoning using an inkjet printer. The print mask can be used for any color (including black) ink utilized by a printer. Each small rectangle represents a pixel. For example, each pixel 1/1200 inch wide by 1/1200 inch tall pixel. Alternatively, any size pixel can be used. An "X" indicates where a drop is made on the media. A scan direction 61 represents movement of a print head with respect to the printer. A media movement direction 62 represents the direction in which media moves with respect to the printer.

To illustrate how AM halftoning can be achieved, different dot sizes are created in different rows by depositing adjacent drops that will coalesce. For example, in a row 64, no drops will be deposited on the media. In a row 65, a single drop is used to form a first sized dot used in AM halftoning. In a row 66, four or five drops are used to form a second sized dot used in AM halftoning. In a row 67, nine drops are used to form a third sized dot used in AM halftoning. In a row 68, thirteen drops are used to form a fourth sized dot used in AM halftoning.

Figure 4:
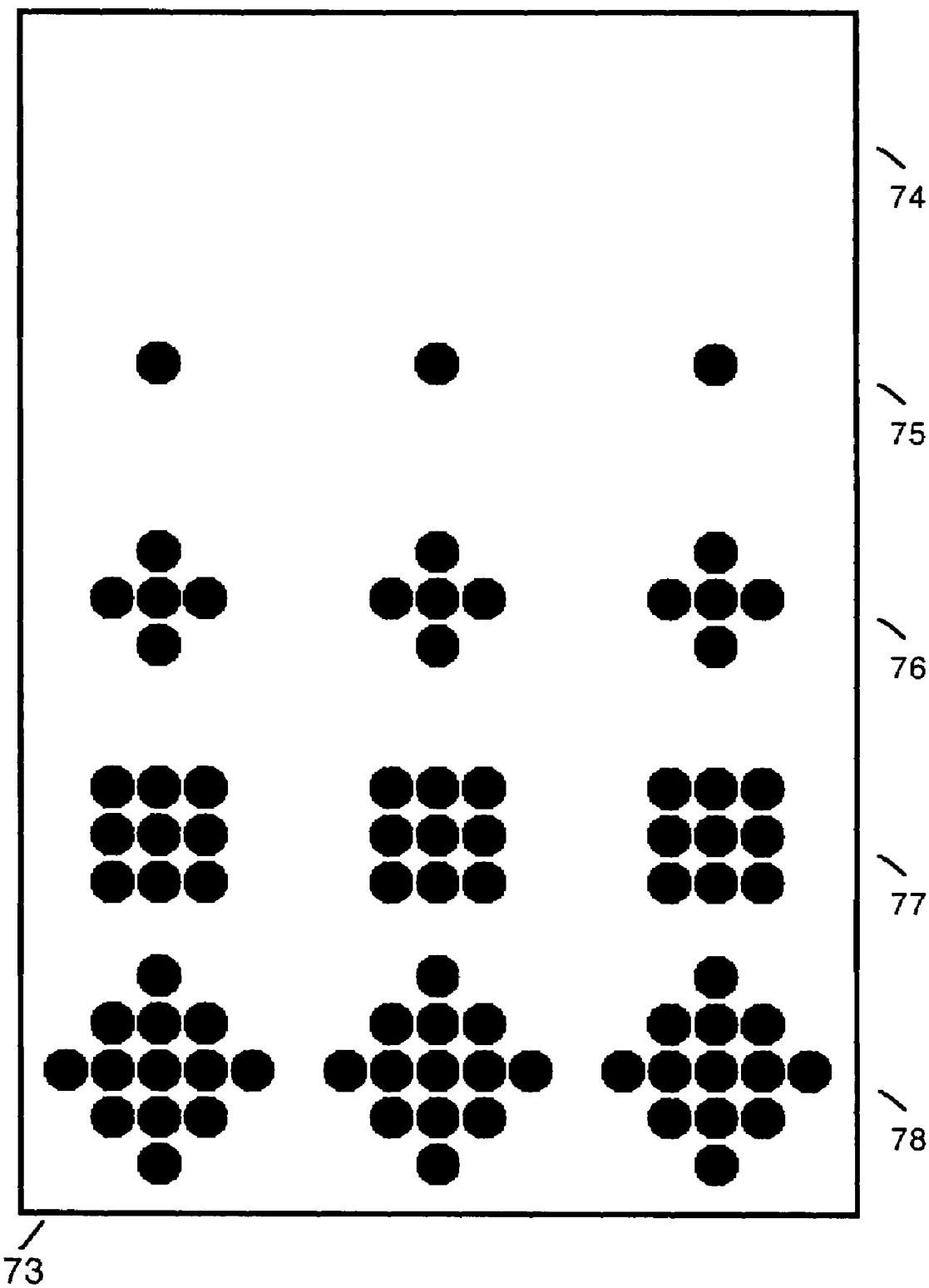
FIG. 4 illustrates deposition of drops upon a media when performing AM halftone printing by the inkjet printer shown in FIG. 1 in accordance with an embodiment of the present invention.

FIG. 4 shows the resulting dot pattern deposited on media 73 by the inkjet printer. FIG. 4 is not to scale, but is meant to be illustrative. In a row 74, no drops are deposited on media 73. In a row 75, for each dot, a single drop is deposited. In a row 76, for each dot, four drops are deposited. In a row 77, for each dot, nine drops are deposited. In a row 78, for each dot, thirteen drops are deposited.

Figure 5:
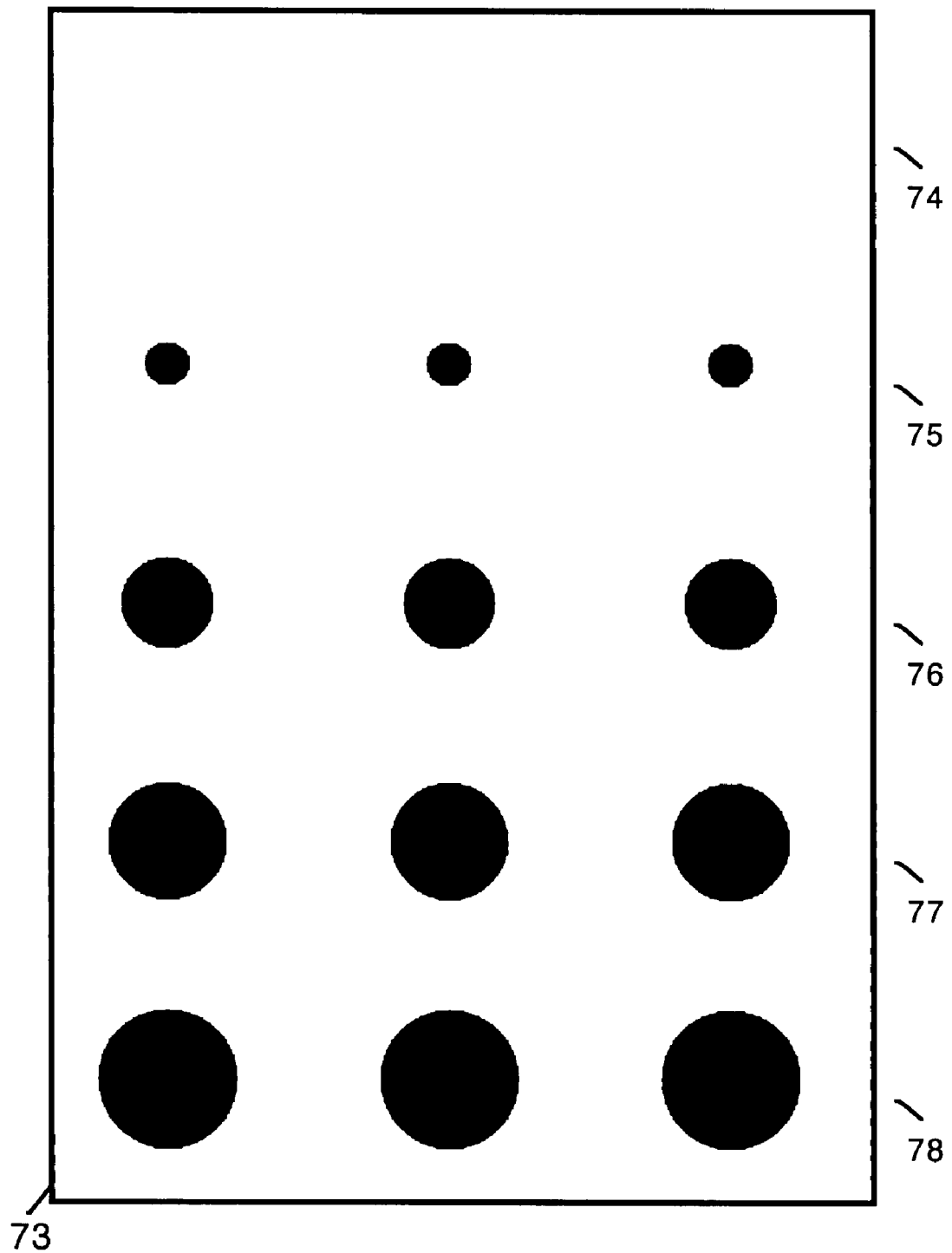
FIG. 5 illustrates coalescence of drops into different sized dots when performing AM halftone printing by the inkjet printer shown in FIG. 1 in accordance with an embodiment of the present invention.

FIG. 5 shows the drops deposited on media 73 coalesced into different sized dots. FIG. 5 is not to scale, but is meant to be illustrative. In row 74, no drops have been deposited on the media. In row 75, each single drop forms the first sized dot used in AM halftoning. In row 76, four or five drops coalesce to form the second sized dot used in AM halftoning. In row 77, nine drops coalesce to form the third sized dot used in AM halftoning. In row 78, thirteen drops coalesce to form the fourth sized dot used in AM halftoning.

In order to induce coalescing, several printing factors can be controlled. For example, the drops are fired at media 73 on the same printing pass. Likewise a media and ink combination is chosen so that colorant migration will occur. This happens, for example, when water based (latex) ink is used on non-porous material, such as PVC, polyethylene, polypropylene, and etc. This allows multiple adjacent drops deposited on media to coalesce into different size dots.

The AM halftoning facilitated by use of coalesced drops allows for a very fast print mode where printing speed can be increased because a certain amount of coalescence is desired. Depending on the resolution of drops and the resulting dots on the media, AM halftoning achieved by use of coalescence of dots may appear grainy under close inspection. For applications where this is undesirable, other types of halftoning can be utilized.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for performing amplitude-modulated halftone printing, said method comprising depositing drops of ink in different multi-dot patterns of at least five adjacent pre-coalescence dots on a print medium so that the adjacent pre-coalescence dots of each pattern coalesce into different-size post-coalescence dots, said different patterns being characterized by respective different numbers of pre-coalescence dots.

2. A method as in claim 1 wherein ink and media type are selected so that colorant migration will occur, facilitating coalescence.

3. A method as in claim 1 wherein the media is formed of non-porous material.

4. A method as in claim 1 wherein the media is formed of one of the following non-porous materials: polyvinylchloride (PVC), polyethylene, polypropylene.

5. A method as in claim 1 wherein all dots of a multi-dot pattern are deposited in a single print pass.

6. A method as recited in claim 1 wherein said different multi-dot patterns include a five-dot pattern, a nine-dot pattern, and a thirteen-dot pattern.

7. An inkjet printer comprising:
one or more printheads with a plurality of nozzles that deposit ink drops on media; and
a controller that controls said printheads and said nozzles so that the inkjet printer prints on the media an amplitude modulated (AM) halftoning pattern where dot size is varied to create different tones and where different sized dots are formed on the media by depositing drops of ink in different multi-dot patterns of at least five adjacent pre-coalescence dots on the same media so that the adjacent pre-coalescence dots of a pattern coalesce into different-sized post-coalescence dots, said different patterns being characterized by respective different numbers of pre-coalescence dots.

8. An inkjet printer as in claim 7 wherein ink and media type are selected so that colorant migration will occur, facilitating coalescence.

9. An inkjet printer as in claim 7 wherein the media is formed of non-porous material.

10. An inkjet printer as in claim 7 wherein the media is formed of one of the following non-porous materials: polyvinylchloride (PVC), polyethylene, polypropylene.

11. An inkjet printer as in claim 7 wherein, when depositing different patterns of adjacent drops that coalesce into the different sized dots, all drops for each dot are deposited in a single print pass in order to facilitate coalescence.

12. An inkjet printer as recited in claim 7 wherein said different multi-dot patterns include a five-dot pattern, a nine-dot pattern, and a thirteen-dot pattern.

13. An inkjet printer comprising:
means for deposit ink drops on media; and,
means for controlling deposition of the ink drops on the media so that the inkjet printer prints on the media an amplitude modulated (AM) halftoning pattern where dot size is varied to create different tones and where different sized dots are formed on the media by depositing drops of ink in different patterns of at least five adjacent pre-coalescence dots that coalesce into different-sized post-coalescence dots, said different patterns being characterized by respective different numbers of pre-coalescence dots.

14. An inkjet printer as in claim 13 wherein ink and media type are selected so that colorant migration will occur, facilitating coalescence.

15. An inkjet printer as in claim 13 wherein the media is formed of non-porous material.

16. An inkjet printer as in claim 13 wherein the media is formed of one of the following non-porous materials: polyvinylchloride (PVC), polyethylene, polypropylene.

17. An inkjet printer as in claim 13 wherein when depositing different patterns of adjacent drops that coalesce into the different sized dots, all drops for each dot are deposited in a single print pass in order to facilitate coalescence.

18. An inkjet printer as recited in claim 13 wherein said different multi-dot patterns include a five-dot pattern, a nine-dot pattern, and a thirteen-dot pattern.

* * * * *